H. C. NEWTON & A. G. M. MICHELL.
APPARATUS FOR USE IN CONNECTION WITH CHECK CIPHER SYSTEMS.
APPLICATION FILED DEC. 30, 1907.
935,536.
Patented Sept. 28, 1909.
6 SHEETS—SHEET 1.
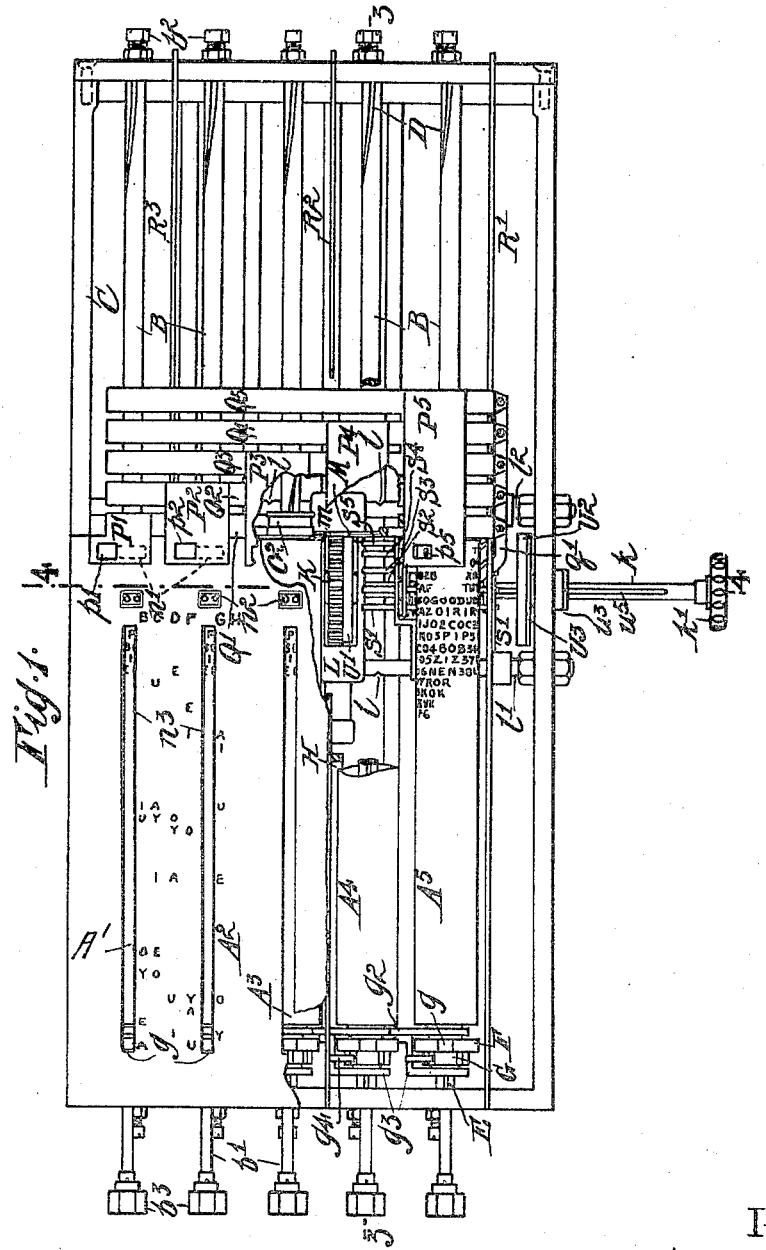
Witnesses
William G. Holden
Reginald W. Nicholls
Inventors
Henry Clement Newton
Anthony George Maldon Michell
By
Attorneys H. C. NEWTON & A. G. M. MICHELL.
APPARATUS FOR USE IN CONNECTION WITH CHECK CIPHER SYSTEMS.
APPLICATION FILED DEC. 30, 1907.
935,536.
Patented Sept. 28, 1909.
6 SHEETS—SHEET 2.
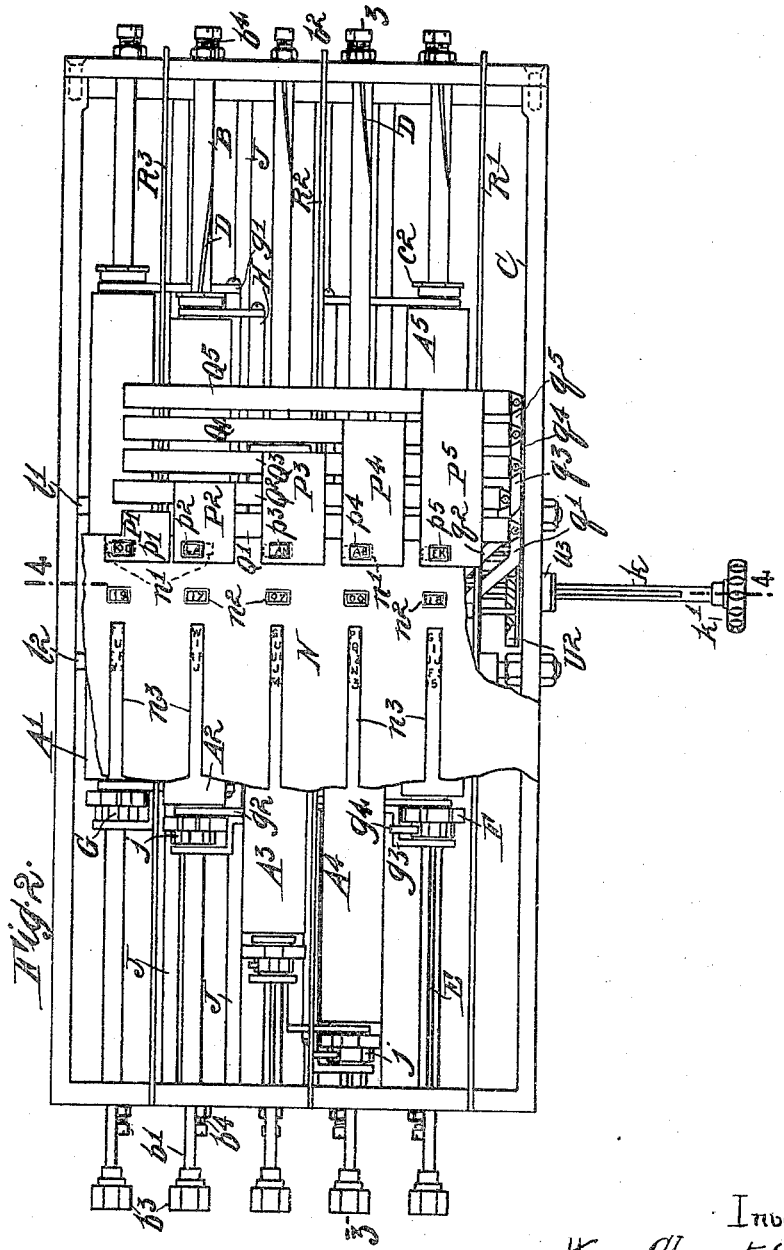

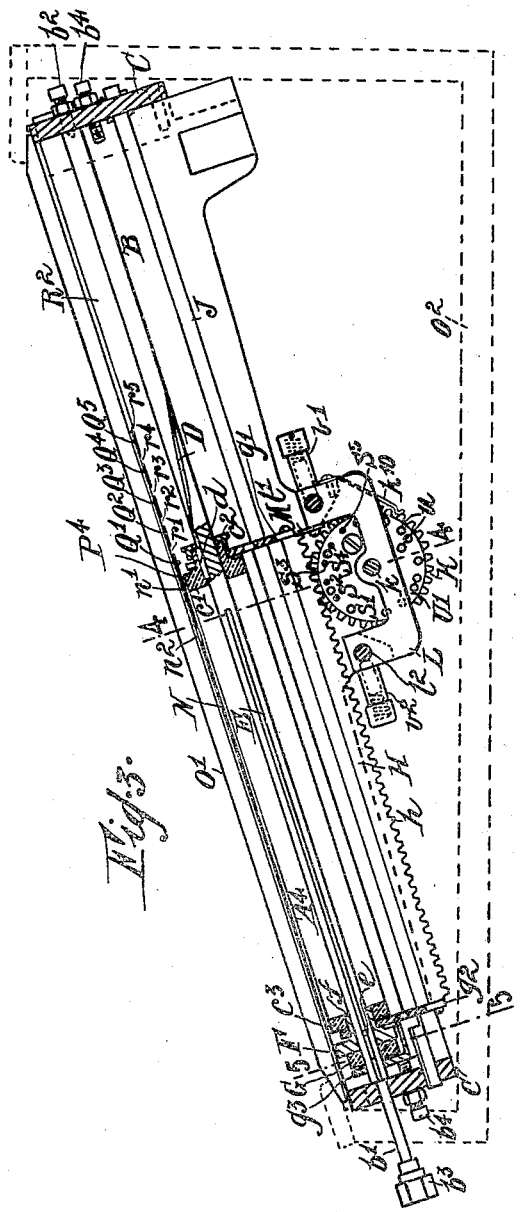

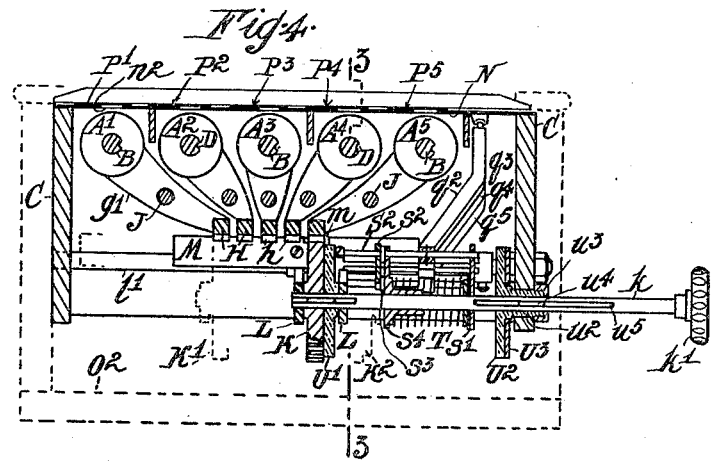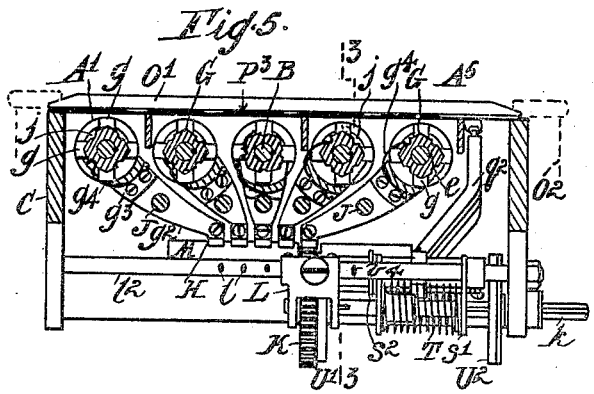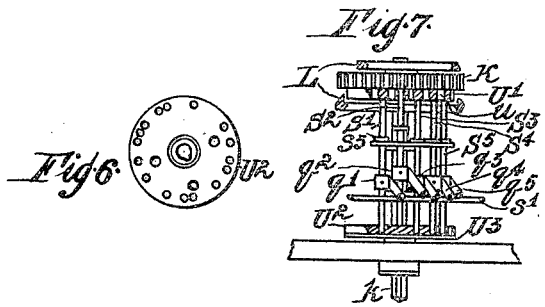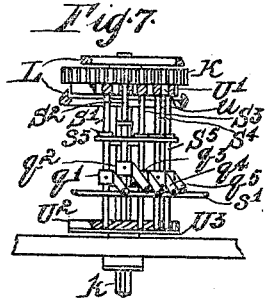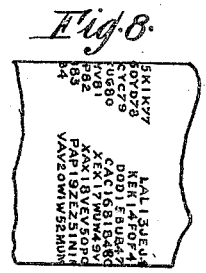

H. C. NEWTON & A. G. M. MICHELL.
APPARATUS FOR USE IN CONNECTION WITH CHECK CIPHER SYSTEMS.
APPLICATION FILED DEC. 30, 1907.
935,536.
Patented Sept. 28, 1909.
6 SHEETS—SHEET 5.
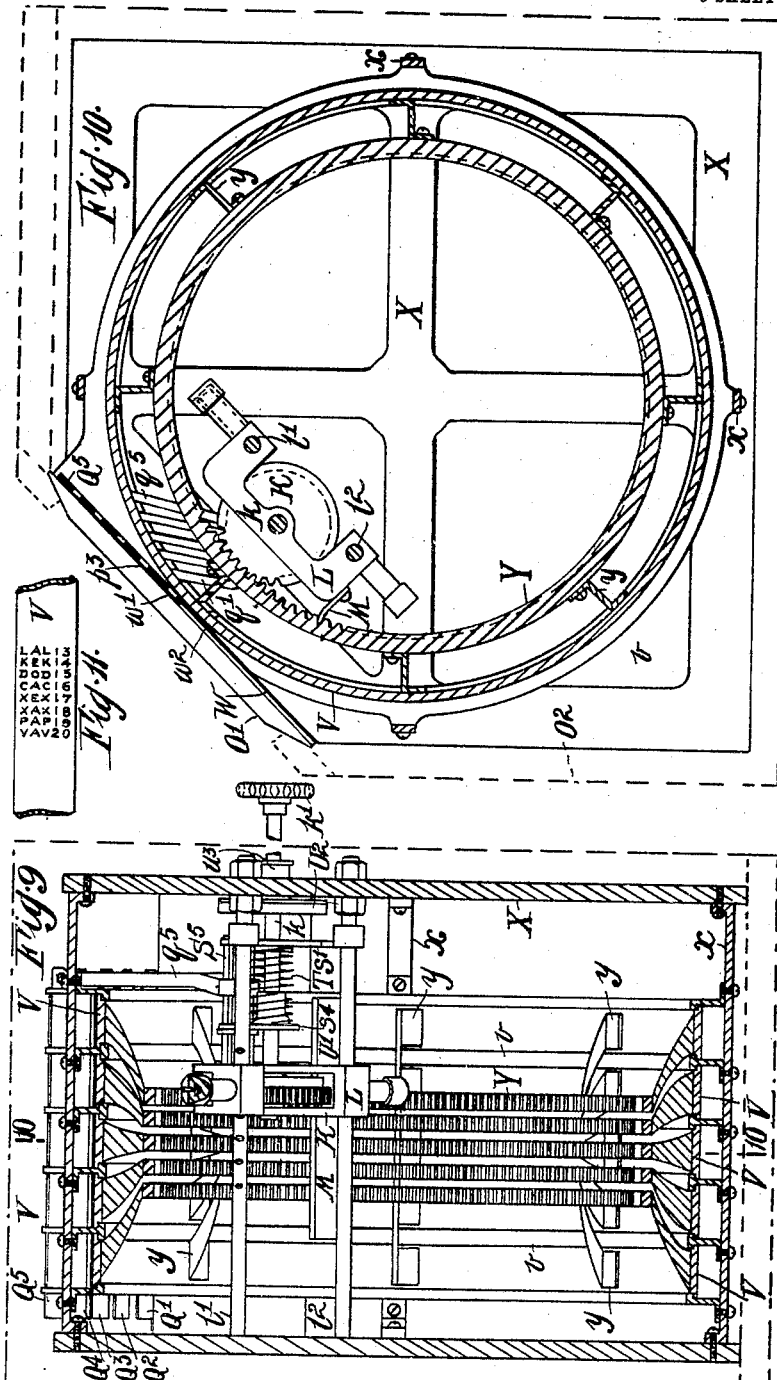

H. C. NEWTON & A. G. M. MICHELL.
APPARATUS FOR USE IN CONNECTION WITH CHECK CIPHER SYSTEMS.
APPLICATION FILED DEC. 30, 1907.
935,536.
Patented Sept. 28, 1909.
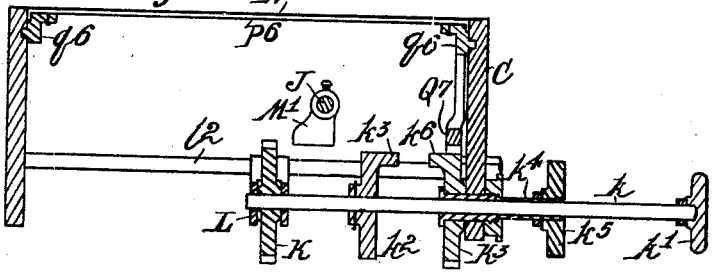
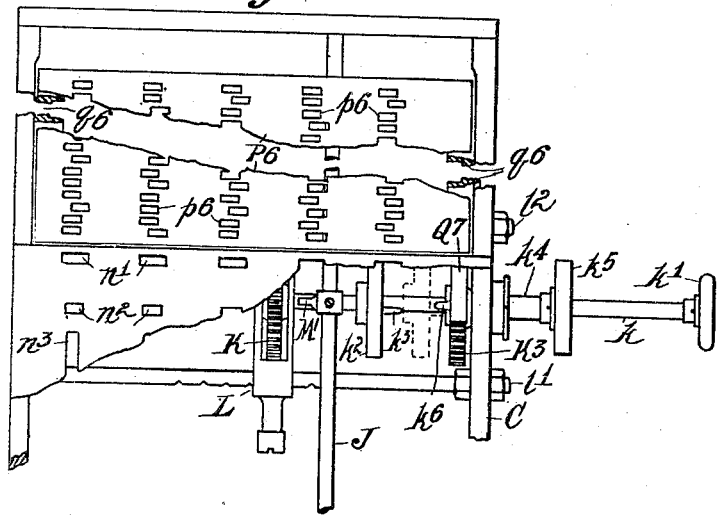
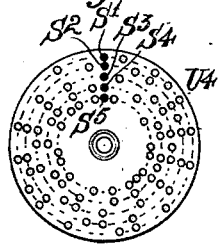
Inventors
Henry Clement Newton
Anthony George Maldon Michell
Witnesses
William G. Holden
Reginald W. Nicholls
By
Attorneys

UNITED STATES PATENT OFFICE.

HENRY CLEMENT NEWTON, OF KEW, NEAR MELBOURNE, AND ANTHONY GEORGE MALDON MICHELL, OF MELBOURNE, VICTORIA, AUSTRALIA.

APPARATUS FOR USE IN CONNECTION WITH CHECK CIPHER SYSTEMS.

935,536.  Specification of Letters Patent.  Patented Sept. 28, 1909.

Application filed December 30, 1907. Serial No. 408,683.

*To all whom it may concern:*

Be it known that we, HENRY CLEMENT NEWTON, a subject of the King of Great Britain, residing at "Kenilworth," Barry street, Kew, near Melbourne, in the State of Victoria, Australia, engineer, and ANTHONY GEORGE MALDON MICHELL, a subject of the King of Great Britain, residing at No. 413 Collins street, Melbourne aforesaid, engineer, have invented Apparatus for Use in Connection with Check Cipher Systems, of which the following is a specification.

The object of the invention is an apparatus for converting cipher-telegrams or other messages expressed according to current usage in numbers, arbitrary syllables, groups of letters or the like, into a system of special-symbols for transmission; for reconverting such a message to the original set of symbols on its receipt, and for checking the accuracy of transmission of the message by comparing a certain assigned numerical property of the symbols of the message with a statement of such property embodied and conveyed implicitly in the message by means of the system of special-symbols.

The system of special symbols referred to consists of a definite number of biliteral symbols in pairs. Each of a pair of symbols consists of the same two letters, one symbol of the pair being designated as the "normal" and the other as the "reversed" symbol of the pair. Either symbol of the pair indifferently stands for, and is equivalent in meaning to one of the set of symbols in which the message was originally expressed. The message expressed in the special symbols is divided into portions of definite length, hereinafter called "words," the number of special-symbols in each word being for instance five, this special case being hereinafter assumed. The provision of alternative normal and reversed special-symbols each having the same code-significance enables a check upon the correctness of transmission of each word to be incorporated in it, the check being superimposed upon the code-meaning. Each word of five special symbols may in fact be transmitted in thirty-two different forms, and thus each particular arrangement of normal and reversed special-symbols is associated with one of the numbers 0 to 31, designated as the check-number of the word. If originally the message was expressed in numbers, or in arbitrary syllables, groups of letters or the like to each of which a numerical value was attached, the summation of these numbers or numerical values gives a number characteristic of the word. If the sum is greater than 32 its remainder after division by 32 is used as the characteristic number, which will thus in all cases be one of the numbers 0 to 31. If the number of special syllables in the words is greater than five, the number of different forms of each word will be doubled for each additional symbol, being 64 for six symbols, and so on and will be correspondingly diminished if the symbols are fewer than five.

In the preparation of the word for transmission the appropriate arrangement of its special-symbols is made such as to bring about the correspondence of the check-number thus expressed with the characteristic number of the original word. Upon receipt a want of correspondence between the check-number expressed by the arrangement of special-symbols in the word as received and the characteristic number derived by summation of the values of the separate symbols as received, constitutes a proof that the word has been incorrectly transmitted.

In the accompanying drawings;—Figure 1 represents a plan view (partly in section) of the apparatus in its initial or zero position. Fig. 2 is a similar view of the apparatus as set to code a typical word. Fig. 3 is a longitudinal section on lines 3—3 of Figs. 1, 2, 4, and 5. Fig. 4 is a cross-section on lines 4—4 of Figs. 1, 2 and 3. Fig. 5 is a cross-section on line 5—5 of Fig. 3. Figs. 6 and 7 are details of portions of the check-mechanism. Fig. 8 is a diagrammatic view of a portion of the chart of symbols used in the apparatus shown in Figs. 1 to 7. Fig. 9 is a transverse central section of an alternative form of the apparatus. Fig. 10 is a section on line 10—10 of Fig. 9. Fig. 11 is a diagrammatic view of a portion of the chart of symbols used in the apparatus shown in Figs. 9 and 10. Figs. 12, 13 and 14 are views of alternative forms of portions of the apparatus.

In the drawings and in the following description the apparatus is illustrated and described as applied to effect the conversion of a message from a numerical code to a code of special-symbols consisting of biliteral syllables, each syllable consisting of a consonant and a vowel. A syllable in which the consonant precedes the vowel is called a "normal" syllable, one in which the vowel precedes the consonant a "reversed" syllable. According to the system already explained, the normal and reversed syllables consisting of the same two letters are treated as a pair, and represent indifferently one and the same code-number. The code-numbers thus represented by individual syllables are the two-figure numbers of the series 00,01–99, together with the single-figure numbers 0,1–9, a sequence of such code-numbers enabling any group of figures in the numerical code to be expressed.

In coding a message from a code-book of numbered phrases, the numbers associated with the phrases of the message are written in succession in the usual way, and are then divided for the purpose of conversion by the apparatus into groups of ten figures, and these again divided into five two-figure numbers. If the total number of figures in the coded message is odd, the division into two-figure numbers is continued as far as possible, with a single-figure number at the end. The characteristic number of each group is the sum of its two-figure numbers, and last single-figure if such a single-figure occurs, or if the sum is greater than thirty-two the characteristic figure is the remainder after the division of the sum by thirty-two.

The functions of the apparatus in the preparation of a message for transmission are the conversion of each ten-figure group into the equivalent word of five normal syllables, and the conversion of these five normal syllables into the particular assemblage of normal and reversed syllables which expresses the characteristic number of the numerical group. Upon receipt of the message the apparatus reconverts the word of five normal or reversed syllables into the equivalent numerical group, and displays the syllables as normal or reversed according to the characteristic number of the group. Any difference between the arrangement of normal and reversed syllables as received and as displayed on the apparatus indicates that there has been alternation of the word during transmission.

The apparatus as shown in Figs. 1 to 8 consists primarily of a series of five cylindrical rollers, $A'$ $A^2$ $A^3$ $A^4$ $A^5$, all similarly formed and operated. Each of the rollers is mounted upon and adapted to slide along a spindle B, which is rotatable in the frame C of the machine being reduced in diameter at one end to form a journal $b'$ and pivoted at its other end on a center-pin $b^2$. The spindles B are arranged in the frame side by side and parallel to one another in one plane which is preferably inclined as shown in Fig. 3. Each spindle has formed in it two grooves D and E, the former being helical and the latter straight.

At the upper end, each roller $A'$—$A^5$ carries a key or pin $d$, which is fixed with respect to the roller in the block $c'$, being retained by the screwed cap $c^2$. The block $c'$ is adapted to slide on the spindle B, and the key $d$ engaging in the groove D compels the roller to turn as it is moved along the spindle. At the lower end of each roller is fixed in it the disk $c^3$, which is bored to receive and turn upon the trunnion $f$ formed on the block F. The latter as well as the cam-disk G, is adapted to slide on the rod B, but is prevented from turning relatively to it by the key $e$ which runs in the groove E and which is held partly in the block F and partly in the disk maintaining them in fixed relative positions.

Each roller is rotatable in a rigid frame or carriage consisting of a rack H, having teeth $h$ on its lower side, and of plates $g'$ and $g^2$, bored out at their upper ends to receive trunnions formed on the blocks $c'$ and F. The racks H are parallel to the spindles B, and the plates $g'$ and $g^2$ have holes through which pass the guide-rods J, which are fixed in the frame parallel to the spindles B. On the plates $g^2$ at the lower ends of the rollers are fixed the brackets $g^3$ which are also bored to receive the spindles B and which with the plates $g^2$ retain the blocks F and cam-disks G in position. Each bracket $g^3$ has fixed upon it a spring $g^4$, adapted to engage in one of the notches $j$ on the cam-disk G as the latter is turned with the spindle B. The latter may thus rest in one or other of four angular positions, when it is rotated in the frame by means of the button $b^3$, which is fitted upon the reduced portion $b'$ of the spindle outside the frame. Screws $b^4$ are provided in the frame C, one at each of the ends of each spindle B, forming adjustable stops for the rollers at the ends of their travel.

Adapted to gear with the racks H is a toothed pinion K having 32 teeth and fixed upon the spindle $k$ which is fitted outside the frame with the milled head $k'$ by means of which the pinion can be both turned and slid transversely to the racks H so that it gears with any one of them at will; the total extent of transverse travel being indicated by the dotted lines $K^1$ $K^2$ in Fig. 4. The spindle $k$ is also journaled in the carriage L which slides with the pinion K upon the rods $l'$ $l^2$ which are fixed transversely in the frame or parallel to the spindle $k$. The rods $l'$ $l^2$ are provided with notches $l$ which engage the spring-pressed plungers $v'$ $v^2$ carried by the carriage L, thus retaining the pinion in engagement with each of the racks in turn. The carriage L has fixed upon it the transverse-bar M, which meshes through the teeth of the racks H, but is formed with a notch $m$ Fig. 4, opposite the pinion K, so that the particular rack with which the pinion is in gear can be moved by the latter, while all the other racks are held stationary. The carriage L also carries a spring $k^{10}$ which presses on the teeth of the pinion, which thus tends to move the rack in steps of length equal to the pitch of the teeth.

Immediately above the rollers $A'$—$A^5$ is a plate N which covers them when in their lowest or zero positions and which has formed in it above the center line of each roller two perforations or windows $n'$ $n^2$ and a longitudinal slot $n^3$, which enable the portions of the roller beneath them to be seen from above. Above the plate N is placed a sheet of glass $O'$ which together with the outer case $O^2$ (shown in dotted lines) inclose and protects the mechanism.

Each roller $A'$—$A^5$ bears on its surface a chart of the mutually convertible numbers and syllables described above the charts being similar and similarly placed on all the rollers. These symbols are arranged in helical columns. The numbers appear in alternate columns in numerical order, the number at the head of each column being zero or a multiple of thirty-two, and the intermediate columns containing the syllables in the order corresponding to the order of the numbers. The longitudinal space allotted to each number or syllable is equal to the pitch of the teeth $h$ of the racks, and the pitch of the helical columns is so arranged that while each number and its equivalent syllable appear substantially on the same axial line, so as to be both displayed on the top of the roller at the same time, the series of numbers and consequently the series of syllables also successively appear beneath the windows $n^2$ and $n'$ respectively in the proper order as the roller slides helically on the rod B.

The normal and reversed syllable of a pair are combined together on a chart so as to form a tri-literal syllable with the letters in the order consonant vowel-consonant. The number of columns of numbers and of syllables shown in the drawings is four corresponding to the four notches $j$ shown on the cam-disk G, but any other number of columns with the corresponding number of notches may be used as convenient to accommodate the symbols which it is desired to use. Fig. 8 is a development of a portion of a roller showing the arrangement just described in which it will be seen that the combined syllable LAL and the number 17, which is the equivalent of that syllable in the code selected for illustration are on one axial line, and the same axial distance apart as the members of the pairs DOD, 19; KIK, 81; etc. The windows $n'$ $n^2$ are the same axial distance apart as these equivalent syllables and numbers, and thus when a number as 17 on roller $A^2$ in Fig. 2 is made to appear in the lower window $n^2$, by moving the roller longitudinally by the pinion K and rotating it if necessary by the head $b^3$, the corresponding syllable LAL will be beneath the window $n'$. In this way in coding a word the five numbers forming a nine or ten-figure group are displayed one upon each of the rollers $A'$—$A^5$ at the windows $n^2$ when the five corresponding combined syllables will be beneath the windows $n'$.

During the setting of the racks and rollers as just described the syllable windows $n'$ which are indicated by dotted lines in Figs. 1 and 2 are covered by the shutters $P'$ $P^2$ $P^3$ $P^4$ $P^5$, (see Fig. 1) and the syllables are consequently invisible. The shutters are movable and provided with apertures $p'$ $p^2$ $p^3$ $p^4$ $p^5$ each of just sufficient width to display two adjacent letters of the combined syllables, the windows $n'$ being as wide as all three letters together; thus by appropriate movements of the shutters $P'$—$P^5$, the five syllables under the windows $n'$ can be displayed as normal or reversed syllables in the order corresponding to the characteristic number of the five two figure numbers simultaneously appearing in the windows $n^2$. The mechanism by which these appropriate movements are made is as follows;—Each of the shutters $P'$—$P^5$ is fixed upon one of the bars $Q'$ $Q^2$ $Q^3$ $Q^4$ $Q^5$ which slide transversely to the rollers being guided by the projections $r'$ $r^2$ $r^3$ $r^4$ $r^5$ of the fixed bars $R'$ $R^2$ $R^3$. The bars $Q'$—$Q^5$ are rigidly connected through the arms $q'$ $q^2$ $q^3$ $q^4$ $q^5$ (Fig. 7) with the sliding bolts $S'$ $S^2$ $S^3$ $S^4$ $S^5$ which slide through holes in the guide-plates $s'$ $s^2$ fixed on the rods $l'$ $l^2$. The bolts $S'$—$S^5$ are spaced at equal distances apart on a cylindrical figure (Fig. 3), whose axis is coincident with the axis of the spindle $k$. Each sliding-bolt has formed upon it a collar $s^3$ and the plate $s^4$ sliding on the spindle $k$ is pressed by the helical spring T against these collars, tending to move the bolts to the left as seen in Figs. 4 and 5. During the setting of the racks and rollers by the pinion K, the bolts $S'$—$S^5$ are thus maintained in their extreme leftward positions with their collars $s^3$ in contact with the plate $s^2$. The shutter-bars $Q'$—$Q^5$ and shutters $P'$—$P^5$ being rigidly connected with the bolts are also in their extreme leftward positions.

Fixed upon the flat side of the pinion K is a disk $U'$ hereafter called the pinion-key, which is drilled with sixteen holes $u$, arranged on a circle so as to be engaged by the bolts $S'$—$S^5$. The pitch-circle of these holes is divided into 32 equal parts, each equal to half the pitch of the bolts, and the sixteen holes $u$ are spaced on these divisions as shown. Another disk $U^2$, to be called the locking-key, similar to the pinion-key U', is keyed upon the spindle $k$, where the latter passes through the frame C. The spindle $k$ slides through the disk $U^2$ without relative rotation. The disk $U^2$ is formed with a trunnion $u^2$, which passes through the frame C and revolves therein, being retained in position by the screwed cap $u^3$, which also serves to retain in position the pin $u^4$ which slides in the groove $u^5$ formed in the spindle. The locking-key is of the same thickness as the pinion-key, and has fastened upon it the plate $U^3$. The locking-key is also drilled with holes, (Fig. 6) adapted to be engaged with the bolts $S'$—$S^5$, but the arrangement of the holes is the inverse of the arrangement in the pinion-key, that is to say each hole in the former stands opposite a blank space in the latter and vice-versa.

After the rollers have been set in their positions for forming a word as before explained, the pinion K with its key U' is drawn by means of the milled head $k'$ out of contact with the racks, which are still retained in position by the bar M, until the plungers $v'$ $v^2$ on the carriage L engage with the notches $v^4$ in the rods $l'$ $l^2$, thus holding the carriage at rest in this position. While the pinion and pinion-key are being drawn into this position they strike the ends of the sliding-bolts $S'$—$S^5$. If a given bolt as $S^2$ Fig. 7 is opposite a hole in the pinion-key it enters into this hole and striking the pinion at the bottom of the hole moves with it to the end of its travel. Those bolts on the other hand as $S'$ $S^3$ $S^4$ $S^5$, Fig. 7, which are not opposite holes in the pinion-key are struck by it and move through a distance greater than the former by the thickness of that key.

As before explained the shutters $P'$—$P^5$ are rigidly connected with the bolts $S'$—$S^5$ respectively and each of them is thus moved through the distance required to display a normal, or a reversed syllable according as its attached bolt is, or is not opposite a hole in the pinion-key. As likewise mentioned, the holes in the locking-key $U^2$ are arranged in inverse order to those in the pinion-key U', so that those bolts which enter into the holes in the one strike the side of the other, and the length of the bolts is such that each bolt is clamped endwise either between the key U' and the plate $U^3$, or between the pinion K and the locking-key $U^2$, thus making the positions of the shutters definite and invariable as long as the pinion K remains in this right-hand position. The arrangement of the sixteen holes in the keys is such that each of the thirty-two possible angular positions of the pinion presents a different succession of holes and spaces opposite the sliding-bolts and consequently produces a different arrangement of normal and reversed syllables in the five syllable windows $n'$. It will also be evident from the foregoing description that the angular position of the pinion corresponds to the remainder obtained when the sum of the numbers appearing in the number windows $n^2$ is divided by thirty-two. Thus for each characteristic number of the five-syllable word, the apparatus forms the corresponding arrangement of normal and reversed syllables, which forms the check as hereinbefore explained.

To facilitate the setting of the rollers $A'$—$A^5$ during the operation of decoding, in which the successive five syllables of the word as received are to be brought under the windows $n'$, the plate N is formed with the five longitudinal slots $n^3$, one over each roller through which one or other of the arms $g$ of the block F is visible, according as one or other column of the chart, upon the corresponding roller is in the operative position. The plate N has displayed upon its upper surface an index-chart of all the syllables so arranged that any desired syllable upon the roller may be brought to the window $n'$ by bringing arm $g$ to a corresponding position shown by the index-chart. The syllables of this index chart, as shown in Fig. 1, are arranged in the form of a table, the consonants being placed at the head of the column and the vowels in their proper relative positions thereunder: Thus, the vowels I, U, O, Y, E, and A, in the first column under the letter B stand for the syllables BI, BU, BO, BY, BE, and BA. When the arm $g$ on any roller is brought to the same level as any one of these syllables, the same syllable appears in the window $n'$. The various arms $g$ of each block F may be distinguished by color or otherwise, and the syllables belonging to the corresponding column similarly indicated on the index-chart so that the column to which any required syllable belongs may be brought into the operative position by turning the button $b^3$. The five syllables of a word having thus been set, the five corresponding numbers will be displayed in the windows $n^2$, and the word is decoded. Its correctness is tested by drawing the pinion to the right and thus operating the shutters $P'$—$P^5$ exactly as explained for the operation of coding. If the arrangement of normal and reversed syllables which is thus displayed differs from the arrangement in the word as received, an error in transmission is indicated.

The alternative form of the apparatus shown in Figs. 9, 10 and 11 operates in essentially the same manner as the form shown in Figs. 1 to 8 and described above. In Figs. 9 and 10 the parts which carry the charts of mutually convertible symbols, thus corresponding to the rollers $A'$ to $A^5$ of Figs. 1–7, are formed as cylindrical rings V; the symbols being arranged on their external peripheries in two parallel circumferential columns, one containing the numbers in numerical order and the other the corresponding combined syllables, and equivalent numbers and syllables having fixed relative positions throughout. An example of the arrangement is shown in Fig. 11, a portion of a chart being represented as developed from the cylinder. Two windows $w'$ $w^2$ through which the syllables and numbers are respectively displayed are formed in the plate W over each of the rings V, the relative positions of these windows corresponding to the relative positions of equivalent syllables and numbers as for instance DOD and 19, Fig. 11. The rings V are rotatably mounted in fixed bearing rings $v$, which are themselves rigidly secured to the frame X of the instrument by means of the transverse bars $x$. Rigidly attached by the brackets $y$ to each of the rings V and concentric with it is an internally toothed ring Y. The rings V are rotated so as to bring the required symbols beneath the windows $w'$ $w^2$, by means of the pinion K gearing with these toothed rings Y in succession. The pinion K is fitted in a carriage L, and upon a transversely sliding spindle $k$ which is furnished with a milled head $k'$ precisely as in the form of apparatus shown in Figs. 1 to 7. The pinion K is constructed with 32 teeth and the number of teeth in the rings Y is a multiple of 32. The angular pitch of the numbers and syllables on the cylinders V is equal to the angular pitch of these latter teeth, so that as in the alternative form, the angular position of the pinion corresponds to the remainder after division of the sum of the numerical values of the symbols by 32.

The checking-gear of the apparatus shown in Figs. 9 to 11 corresponds part for part with the gear shown in Figs. 1 to 8, and being similarly lettered in the drawings need not be again described.

Instead of the form of pinion-key and locking-key described above, there may be used keys such as that shown in Fig. 12. In this case the key $U^4$ is formed with five circles of holes instead of one circle only, each circle having sixteen holes as before arranged on thirty-two equal divisions of the circle. The bolts $S'$—$S^5$ are in this case arranged radially so that each of them engages with one or other of the holes of one circle, and these bolts are actuated in the checking operation by the pinion-key $U^4$ and a corresponding locking-key (not shown) having its holes drilled in the inverse order in the same manner as described before. The arrangement of holes in Fig. 12 is such that a different combination of holes and blanks occurs on the radius-line of the bolts for each of the thirty-two possible positions of the pinion-key.

Figs. 13 and 14 illustrate an alternative form of checking apparatus shown as applied in connection with the roller form of charts. The shutters $P'$—$P^5$ of Figs. 1 to 8 and their attached parts are replaced by a single shutter-plate $P^6$ which extends across the whole width of the machine and is fitted with guides $q^6$ sliding in grooves in the frame C. In this form of machine the fixed plate N is constructed with windows $n'$ and $n^2$ as before described but is raised relatively to the rollers to a sufficient height to allow the plate $P^6$ to pass beneath it. The pinion K and carriage L are constructed as before, but the pinion-key is omitted. The pinion-spindle $k$ has fixed upon it a disk $k^2$ furnished with a blade or stop $k^3$ projecting from it parallel to the spindle. In the place of the locking-key $U^2$ is provided a pinion $K^3$ of the same size and number of teeth as the pinion K, which is fixed on a sleeve $k^4$ surrounding the spindle $k$ and rotated relatively to both the spindle $k$ and the frame C by the milled head $k^5$ outside the frame. The pinion $K^3$ is fitted with a stop $k^6$ projecting toward the disk $k^2$ and gears with the rack $Q^7$ rigidly attached to the shutter-plate $P^6$ as shown.

The operation of setting the symbols of the chart-bearing rollers beneath the windows having been performed exactly as previously described in connection with Figs. 1 to 8, the pinion K is drawn to the right until the disk $k^2$ arrives at the position shown by the dotted lines in Fig. 14. The disk $k^2$ and pinion K may have any angular position corresponding to the sum of the numerical values of the symbols set beneath the windows. Whatever such angular position the pinion K may have when disengaged from the last rack H, it is compelled to retain by the fixed blade M' which meshes in its teeth as it is drawn farther to the right. The pinion K and disk $k^2$ being thus prevented from rotating, the pinion $K^3$ is rotated by the milled head $k^5$, so as to draw the shutter $P^6$ down over the rollers and beneath the plate N, until the stop $k^6$ strikes the stop $k^3$ and prevents further movement. The plate $P^6$ is formed with transverse rows of windows $p^6$, one window of each row being over each roller and longitudinally spaced so as to register with the circumferential rows of windows on the roller-charts.

The individual windows are of such size as to display two letters of a combined syllable, and they are placed either slightly to the left or slightly to the right of the center lines of the rollers so as to show either a normal or reversed syllable. The combination of such left or right windows in any row is different from that in any other row, and thus the arrangement of normal and reversed syllable will depend upon which row of the shutter registers with the row of holes $n'$ of the plate N, as determined by the position of the stop $k^3$, and consequently on the characteristic number of the word which has been set.

It will be apparent that with modifications of form the check gear shown in Figs. 13 and 14 may also be applied in connection with the form of apparatus shown in Figs. 9 to 11.

Having now particularly described and ascertained the nature of our said invention and in what manner the same is to be performed, we declare that what we claim is:—

1. An apparatus for use in connection with check cipher-systems, which comprises a series of movable elements all similarly formed and similarly operated, and bearing charts of the symbols of which the message is composed, means for moving the elements by amounts depending on numerical values associated with the symbols, and means for summing the movements of the elements and displaying various selections of the symbols upon the charts according to the value of the sum as obtained.

2. In an apparatus for use in connection with check cipher-systems, a series of movable elements all similarly formed and similarly operated and bearing similar charts of two mutually convertible systems of symbols; means for displaying in fixed positions a sequence of symbols of one of the systems, selecting one from each chart by movement of the chart-bearing elements from their zero positions by suitable amounts; means for simultaneously displaying the corresponding sequence of symbols of the other system in corresponding fixed positions, and an integrating element gearing with each of the chart-bearing elements in succession and adapted to sum the amounts of their movements for the purpose set forth.

3. In an apparatus for use in connection with check cipher-systems, a series of rotatable and longitudinally movable rollers bearing charts of two mutually equivalent systems of symbols, means for simultaneously displaying a pair of equivalent symbols upon each roller and means for rotating the rollers about their axes as well as moving them longitudinally so as to locate the symbols required to be displayed.

4. In an apparatus for use in connection with check cipher-systems, a series of helically grooved rods and a series of rollers mounted on said rods and bearing charts of two mutually equivalent systems of symbols arranged in helical columns substantially as described.

5. In an apparatus for use in connection with check cipher-systems, a series of elements displaying symbols in alternative forms and a series of movable shutters adapted to display the symbols in either form substantially as and for the purpose set forth.

6. In an apparatus for use in connection with check-cipher-systems, a series of toothed elements each carrying a chart of symbols used in the system and in alternative form, a series of movable shutters adapted to display the symbols in either form, a pinion adapted to gear in succession with each of the elements and a key turning with the pinion and controlling the movements of the shutters according to the angular position of the pinion substantially as and for the purpose set forth.

In testimony whereof we have hereunto set our hands in presence of two subscribing witnesses.

HENRY CLEMENT NEWTON.
ANTHONY GEORGE MALDON MICHELL.

Witnesses:
EDWARD WATERS,
WALTER C. HART.